(12) United States Patent
Fujimoto

(10) Patent No.: US 8,075,143 B2
(45) Date of Patent: Dec. 13, 2011

(54) FOREIGN SUBSTANCE REMOVING APPARATUS

(75) Inventor: Kosuke Fujimoto, Kawasaki (JP)

(73) Assignee: Canon Kabushiki Kaisha (JP)

( * ) Notice: Subject to any disclaimer, the term of this patent is extended or adjusted under 35 U.S.C. 154(b) by 836 days.

(21) Appl. No.: 11/682,419

(22) Filed: Mar. 6, 2007

(65) Prior Publication Data

US 2007/0223966 A1    Sep. 27, 2007

(30) Foreign Application Priority Data

Mar. 27, 2006  (JP) .................................. 2006-086061

(51) Int. Cl.
 *G02B 7/00* (2006.01)
 *G02B 26/00* (2006.01)
 *H01L 41/00* (2006.01)
(52) U.S. Cl. .................... 359/507; 359/291; 310/328
(58) Field of Classification Search .............. 359/507, 359/513, 291; 310/328
 See application file for complete search history.

(56) References Cited

U.S. PATENT DOCUMENTS

| | | | | |
|---|---|---|---|---|
| 3,171,683 A | * | 3/1965 | Ludwig | 296/96.15 |
| 4,929,072 A | * | 5/1990 | Fujie et al. | 359/507 |
| 5,012,593 A | * | 5/1991 | Okada et al. | 34/69 |
| 6,910,814 B2 | * | 6/2005 | Kawai et al. | 396/529 |
| 7,006,138 B2 | * | 2/2006 | Kawai | 348/340 |
| 7,215,372 B2 | * | 5/2007 | Ito et al. | 348/340 |
| 7,483,075 B2 | * | 1/2009 | Kobayashi | 348/374 |
| 2003/0202114 A1 | * | 10/2003 | Takizawa et al. | 348/335 |
| 2003/0214588 A1 | * | 11/2003 | Takizawa et al. | 348/207.99 |
| 2004/0047625 A1 | * | 3/2004 | Ito et al. | 396/429 |
| 2004/0090549 A1 | * | 5/2004 | Takizawa et al. | 348/340 |
| 2004/0169761 A1 | * | 9/2004 | Kawai et al. | 348/335 |
| 2004/0263669 A1 | * | 12/2004 | Kobayashi | 348/340 |

FOREIGN PATENT DOCUMENTS

| | | |
|---|---|---|
| JP | 2002-204379 A | 7/2002 |
| JP | 2003-280110 A | 10/2003 |
| JP | 2003-333391 A | 11/2003 |
| JP | 2003338966 A | 11/2003 |
| JP | 2004-012474 A | 1/2004 |
| JP | 2004023159 A | 1/2004 |

OTHER PUBLICATIONS

Office Action issued Sep. 6, 2011 for corresponding Japanese Patent Application No. 2006-0896061.

* cited by examiner

*Primary Examiner* — Ricky Shafer
(74) *Attorney, Agent, or Firm* — Rossi, Kimms & McDowell LLP

(57) ABSTRACT

A foreign substance removing apparatus that can provide the desired vibration amplitude to a light transmitting member, without using a large driving voltage. The foreign substance removing apparatus removes foreign substances adhered to a surface of an optical member disposed in a light ray incident path and includes a piezoelectric element fixed to a first plane of the optical member, a circular disk fixed to a second plane, opposite from the first plane, of the optical member so as to face the piezoelectric element, and a driving unit for applying an AC voltage to the piezoelectric element to cause the optical member to elastically vibrate in a direction perpendicular to the planes thereof, thereby removing the foreign substances adhered to the surface of the optical member.

6 Claims, 11 Drawing Sheets

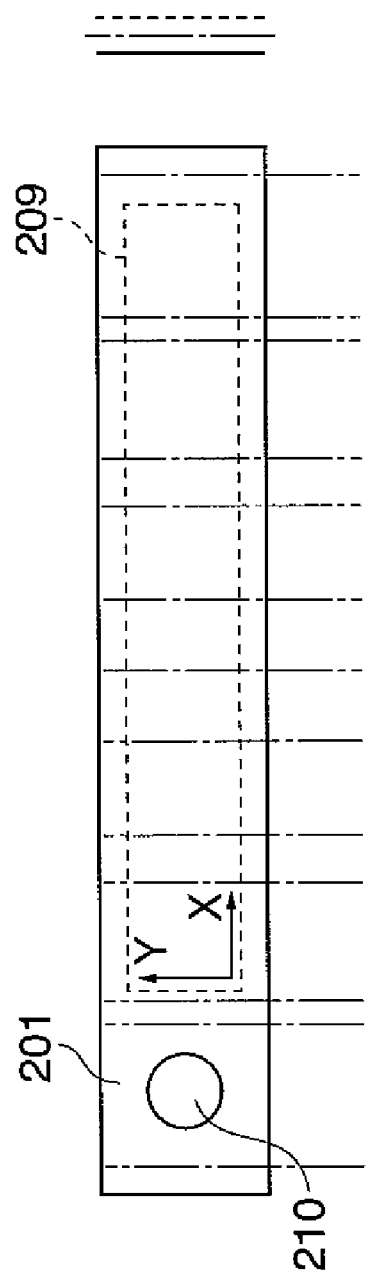
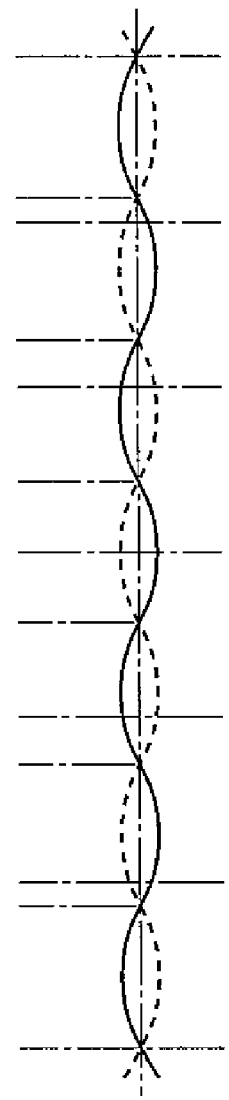
FIG. 9A PRIOR ART
FIG. 9B PRIOR ART
FIG. 9C PRIOR ART
FIG. 9D PRIOR ART

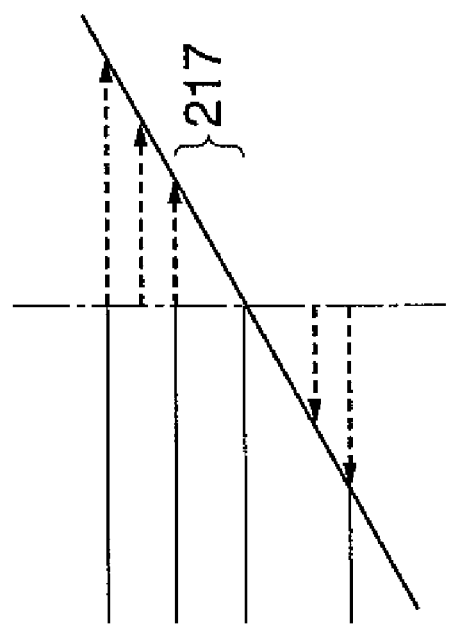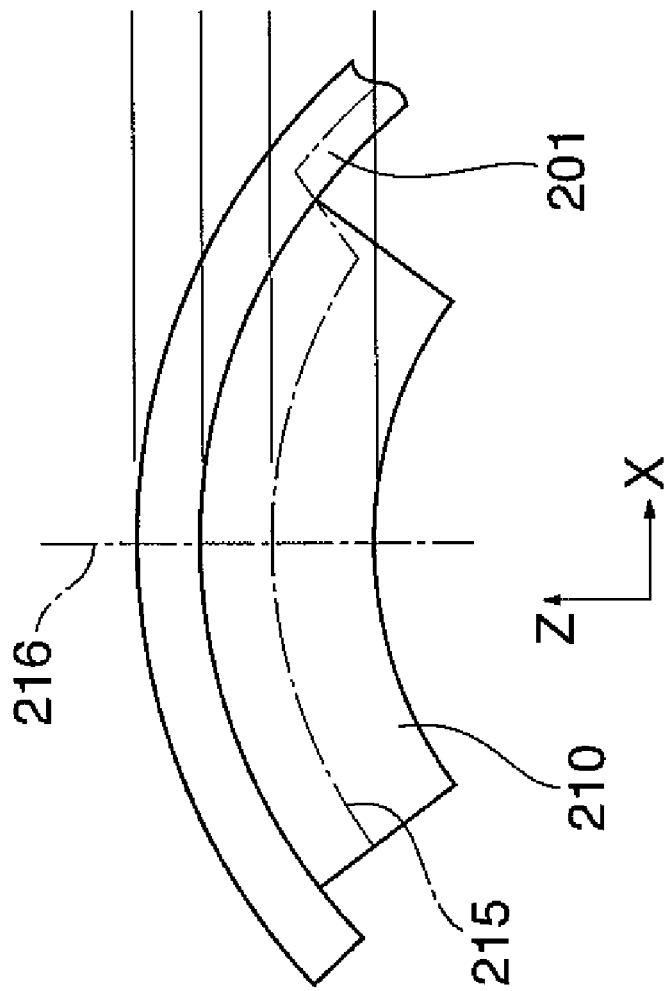
FIG. 10A PRIOR ART
FIG. 10B PRIOR ART

FOREIGN SUBSTANCE REMOVING APPARATUS

BACKGROUND OF THE INVENTION

1. Field of the Invention

The present invention relates to a foreign substance removing apparatus, and more particular, to a foreign substance removing apparatus for removing foreign substances adhered to a surface of a plate-like light transmitting member disposed in a light ray incident path.

The foreign substance removing apparatus is mounted to an original reading apparatus of a copying machine, a facsimile machine, a document scanner or the like or mounted to an image pickup apparatus such as a video camera and a still camera.

2. Description of the Related Art

In a recent image pickup apparatus, a shot image is much affected by dusts adhered to an optical system of the image pickup apparatus, with improvement of resolution of an optical sensor of the apparatus. In particular, with remarkable improvement of resolution of an image pickup device of a video camera, a still camera or the like, dusts are sometimes captured in a shot image. More specifically, when dusts from the outside or abrasive dusts produced by friction in the image pickup apparatus are adhered to an infrared ray cut filter, an optical low pass filter or the like disposed near the image pickup device, such dusts are captured in a shot image.

When reading a planar original disposed close to a line sensor of an image pickup unit of a facsimile machine, a document scanner or the like, the image pickup unit repetitively scans the original in a lengthwise direction of the line sensor (main scanning direction) while relatively moving the line sensor and the original in a sub-scanning direction. At this time, if dusts are adhered to a light ray incident part of the line sensor, the dusts are captured in the read image. In particular when dusts are adhered to the line sensor, the dusts are each captured in the image as a continuous line image extending in the sub-scanning direction, thus greatly impairing the quality of the image.

Although the desired image quality can be restored by a human intervention wiping foreign substances with a cloth or the like, a human operator is not aware of dust adherence until completion of shooting or image reading. When an image obtained by the shooting or image reading is in an electronic data form, the obtained image in which dust images have been captured can be corrected using an image processing software. However, laborious correcting operations are required. When the obtained image is output onto a paper medium, the paper medium is wastefully consumed.

Therefore, a camera with a dustproof mechanism that removes dusts using vibration has been proposed as disclosed in Japanese Laid-open Patent Publication Nos. 2002-204379 and 2003-333391, and an image reading apparatus using vibration to cause dusts to move away from an image reading unit has also been proposed as disclosed in Japanese Laid-open Publication Nos. 2003-280110 and 2004-012474.

FIG. 8 is a perspective view of an image reading apparatus disclosed in Japanese Laid-open Publication No. 2003-280110.

Referring to FIG. 8, a reader section 200 is provided that optically reads image information recorded on an original and optoelectrically converts the image information into image data. The reader section 200 includes a platen glass 201 for auto document feeder (ADF), hereinafter referred to as the "ADF platen 201", a platen glass 202 for book-original, and a scanner unit 209 including a lamp 203 and a mirror 204. The reader section 200 further includes mirrors 205, 206, a lens 207, a CCD sensor (not shown), and the like.

When reading an image of an original conveyed from an ADF, not shown, the reader section 200 causes the scanner unit 209 to move to and stop at a location beneath the ADF platen 201, and reads image information while the original is conveyed along the ADF platen 201.

Reference numeral 210 denotes a piezoelectric element attached to a lower surface of the ADF platen 201. A high-frequency signal is applied from a circuit, not shown, to the piezoelectric element. As a result, bending vibration is produced in the ADF platen 201. The bending vibration removes foreign substances from the ADF platen 201, if they have been adhered to the ADF platen 201, whereby the foreign substances are prevented from being captured in a shot image. The piezoelectric element 210 is positioned so as not to hinder an optical image of an original from passing through the ADF platen 201 and reaching the scanner unit 209.

The ADF platen 201 is supported by a housing of the reader section 200 via supporting members made of an elastic material and disposed near the ADF platen 201. A foreign substance removing apparatus of the reader section 200 is comprised of the ADF platen 201, the piezoelectric element 210, and the supporting members.

FIGS. 9A through 9D are views showing bending vibrations produced in the ADF platen 201 by the piezoelectric element 210. The bending vibrations include multiple-order standing waves. FIG. 9B shows a first vibration mode, and FIG. 9C shows a second vibration mode. The first vibration mode is a seventh-order mode where eight nodes are present in the platen, and the second vibration mode is a sixth-order mode where seven nodes are present therein. As shown in FIG. 9D, each of the first and second vibration modes has a Y-directional vibration displacement distribution which is uniform without any nodes.

Vibrations in at least first and second vibration modes are sequentially applied from the piezoelectric element 210 to the ADF platen 201. As a result, vibrations are produced at various parts of the ADF platen 201. Since positions of the nodes in the first vibration mode are different from those in the second vibration mode, vibrations are produced at every position on the ADF platen 201. As a result, foreign substances are peeled off and moved away from the ADF platen 201.

However, the conventional foreign substance removing apparatus provided in the image reading apparatus in FIG. 8 poses the following problems.

FIG. 10A is a section view of the ADF platen 201 of the conventional foreign substance removing apparatus in FIG. 8 taken along an X-Z plane at a location near the piezoelectric element 210, and FIG. 11A is a section view of the ADF platen 201 taken along an X-Z plane at a location away from the piezoelectric element 210.

The ADF platen 201, which is a rectangular plate-like light transmitting member, is affixed with the circular plate-like piezoelectric element 210 using adhesive. FIG. 10A shows a sectional shape of the piezoelectric element 210 observed when a bending vibration in the piezoelectric element 210 causes a maximum Z-directional (thickness-directional) displacement of the piezoelectric element 210 at a location near the center 216 of the circular plate that forms the piezoelectric element 210. In FIGS. 10A and 11A, reference numeral 215 denotes a bending neutral surface, which represents a surface position where no X-directional elongation/contraction is produced by the bending vibration. In FIGS. 10B and 11B, the magnitudes of X-directional strains in the ADF platen 201 and the piezoelectric element 210 are represented by the lengths of arrows shown therein, in which the right pointing arrows represent elongation and the left pointing arrows represent contraction.

As shown in FIG. 11A, the bending neutral surface 215 is located at the thickness-directional (Z-directional) center of the ADF platen 201 in a part of the ADF platen 201 to which the piezoelectric element 210 is not affixed. On the other hand, in another part of the ADF platen 201 to which the piezoelectric element 210 is affixed and the rigidity of the piezoelectric element 210 is added, the bending neutral surface 215 is shifted toward the piezoelectric element 210 so as to be sometimes positioned in the piezoelectric element 210, as shown in FIG. 10A.

For the above reasons, the following two problems are caused.

First, an allowable vibration amplitude corresponding to a rupture limit of the ADF platen 201 decreases.

The ADF platen 201 made of an optical material such as glass or quartz is relatively low in rupture limit. When the bending neutral surface 215 is inside the ADF platen 201 as shown in FIG. 11A, the ratio of tensile stress in the upper and lower surfaces of the ADF platen 210 to amplitude of the bending vibration decreases to a minimum. On the other hand, at that part of the ADF platen 201 to which the piezoelectric element 210 is affixed, the bending neutral surface 215 is away from the ADF platen 201 as shown in FIG. 10A, and the tensile stress in the ADF platen 201 shown in FIG. 10A increases since the amount of strain varies in proportion to the distance from the neutral surface 215. As a result, the allowable vibration amplitude at which the rupture limit of the ADF platen 201 shown in FIG. 10A is reached decreases to be smaller than the allowable vibration amplitude corresponding to the rupture limit of the ADF platen 201 shown in FIG. 11A. Therefore, there is a risk that vibration having a sufficient amplitude cannot be applied to the ADF platen 201.

Second, an applicable force which the piezoelectric element 210 can apply to the ADF platen 201 decreases.

The piezoelectric element 210 is polarized in advance in the thickness direction (Z direction). A rear surface electrode is provided in a rear surface of the piezoelectric element 210 at which the piezoelectric element is affixed to the ADF platen 201, and a front surface electrode is provided in a front surface of the piezoelectric element, which is opposite from the rear surface. When a potential difference is applied across these electrodes, X-directional elongation/contraction stress is produced in the piezoelectric element 210 due to lateral electostrictive effect. In the piezoelectric element 210 which is in a state shown in FIG. 10A, a uniform contraction stress is produced in the piezoelectric element 210 in the thickness direction.

By virtue of the stress being produced, an X-directional elongation strain is produced in an upper region above the bending neutral surface 215 inside the piezoelectric element 210, and an X-directional contraction strain is produced in a lower region below the bending neutral surface 215.

As a result, despite that contraction stress is produced in a region 217 extending from the surface at which the piezoelectric element 210 and the ADF platen 201 are affixed together to the bending neutral surface 215, an elongation strain is produced in the region 217, and therefore, the stress does not effectively act. Specifically, in the region 217, even when a sufficient voltage is applied to the piezoelectric element 210, the desired vibration amplitude cannot be produced in the ADF platen 201.

An object of the present invention is to provide a foreign substance removing apparatus that can provide the desired vibration amplitude to a light transmitting member, without using a large driving voltage.

SUMMARY OF THE INVENTION

To attain the object, according to the present invention, there is provided a foreign substance removing apparatus for removing foreign substances adhered to a surface of a plate-like light transmitting member disposed in a light ray incident path, comprising an electromechanical energy conversion element fixed to a first plane of the light transmitting member, an elastic member fixed to a second plane of the light transmitting member so as to face the electromechanical energy conversion element, the second plane being opposite from the first plane, and an AC voltage applying circuit for applying an AC voltage to the electromechanical energy conversion element to cause the light transmitting member to elastically vibrate in a direction perpendicular to the planes thereof, thereby removing the foreign substances adhered to the surface of the light transmitting member.

Further features and aspects of the present invention will become apparent from the following detailed description of exemplary embodiments with reference to the attached drawings.

BRIEF DESCRIPTION OF THE DRAWINGS

FIG. 9A is a view showing an ADF platen;

FIG. 9B is a view showing a bending vibration produced in the ADF platen in FIG. 9A by means of a piezoelectric element;

FIG. 9C is a view showing another bending vibration in the ADF platen;

FIG. 9D is a view showing a bending vibration displacement distribution in the ADF platen;

FIG. 10A is a fragmentary section view, taken along an X-Z plane of the conventional foreign substance removing apparatus in FIG. 8, showing part of the ADF platen near the piezoelectric element;

FIG. 10B is a view showing an X-directional strain in the ADF platen and the piezoelectric element;

FIG. 11 A is a fragmentary section view, taken along an X-Z plane of the conventional foreign substance removing apparatus in FIG. 8, showing part of the ADF platen at a location away from the piezoelectric element in the X direction.

DETAILED DESCRIPTION OF THE EMBODIMENTS

The following description of exemplary embodiments, features and aspects of the present invention is merely illustrative in nature and is in no way intended to limit the invention, its application, or uses.

First Embodiment

Figure 1A:
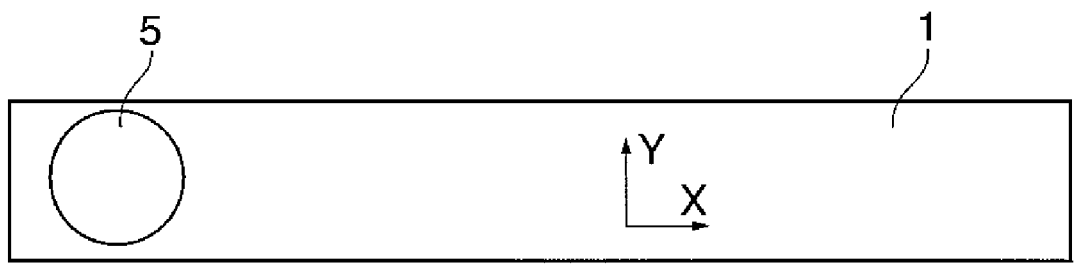
FIG. 1A is a plan view showing the construction of a foreign substance removing apparatus according to a first embodiment of the present invention.
Figure 1B:
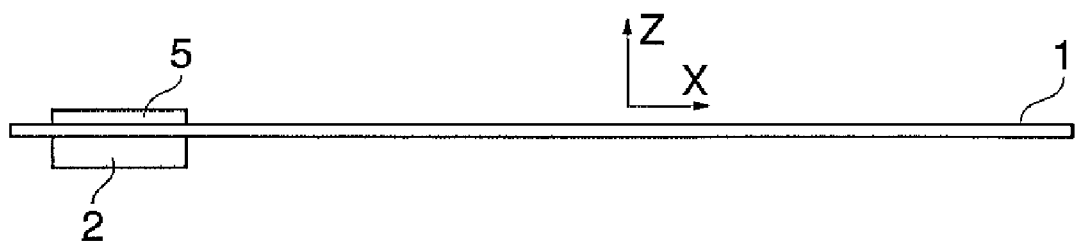
FIG. 1B is a side view of the foreign substance removing apparatus.
Figure 1C:
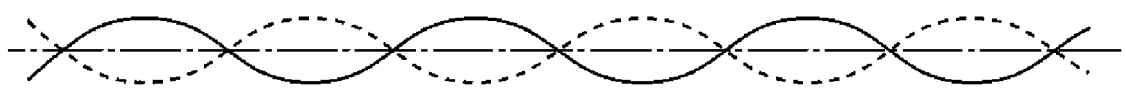
FIG. 1C is a view showing a displacement distribution in a vibration mode of the foreign substance removing apparatus.
Figure 1D:
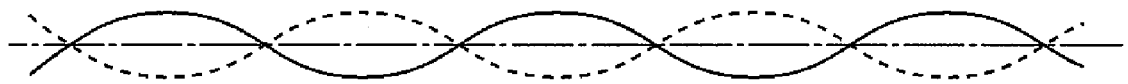
FIG. 1D is a view showing a displacement distribution in another vibration mode of the foreign substance removing apparatus.

FIG. 1A is a plan view showing the construction of a foreign substance removing apparatus according to a first embodiment of the present invention, FIG. 1B is a side view thereof, and FIGS. 1C and 1D are views showing displacement distributions in two vibration modes in which the foreign substance removing apparatus is caused to vibrate.

In the present embodiment, the foreign substance removing apparatus is adapted to be mounted to a reader section of a copying machine. Further, the foreign substance removing apparatus includes a vibrating member comprised of a rectangular plate-like glass optical member 1 and a circular plate-like piezoelectric element 2 joined to a rear surface of the optical member 1. The optical member 1 corresponds to the ADF original platen glass 201 in FIG. 9. The piezoelectric element 2 is positioned so as not to hinder an optical image of an original from reaching a scanner unit 9 after passing through the optical member 1. It should be noted that, using adhesive or the like, a stainless plate-like circular disk 5 is affixed to one surface of the optical member 1, which is opposite from another surface thereof affixed with the piezoelectric element 2. The circular disk 5 is nearly the same in diameter as the piezoelectric element 2 and disposed such that the center line of the circular disk is in alignment with that of the piezoelectric element 2. Specifically, the circular disk 5 has a predetermined shape and is disposed at a predetermined position. The predetermined shape and position are set beforehand in such a manner that a projected shape of the circular disk 5 on the optical member 1 is coincidence with a projected shape of the piezoelectric element 2 on the optical member 1. In a plane extending parallel to the surface at which the piezoelectric element 2 is affixed to the optical member 1, the circular disk 5 and the piezoelectric element 2 are each formed to have an area sufficiently smaller than that of the optical member 1, so that only part of the optical member 1 is sandwiched between the circular disk 5 and the piezoelectric element 2.

In this foreign substance removing apparatus, the optical member 1 is adapted to vibrate in a bending vibration mode in which seven nodes are present as shown in FIG. 1C and a bending vibration mode in which six nodes are present as shown in FIG. 1D. As a result, a Z-directional vibration (i.e., vibration in a direction perpendicular to a surface of the optical member 1) occurs at any X-directional position of the optical member 1, whereby foreign substances adhered to the optical member 1 can be peeled off and caused to move away from the optical member 1.

Figure 2:
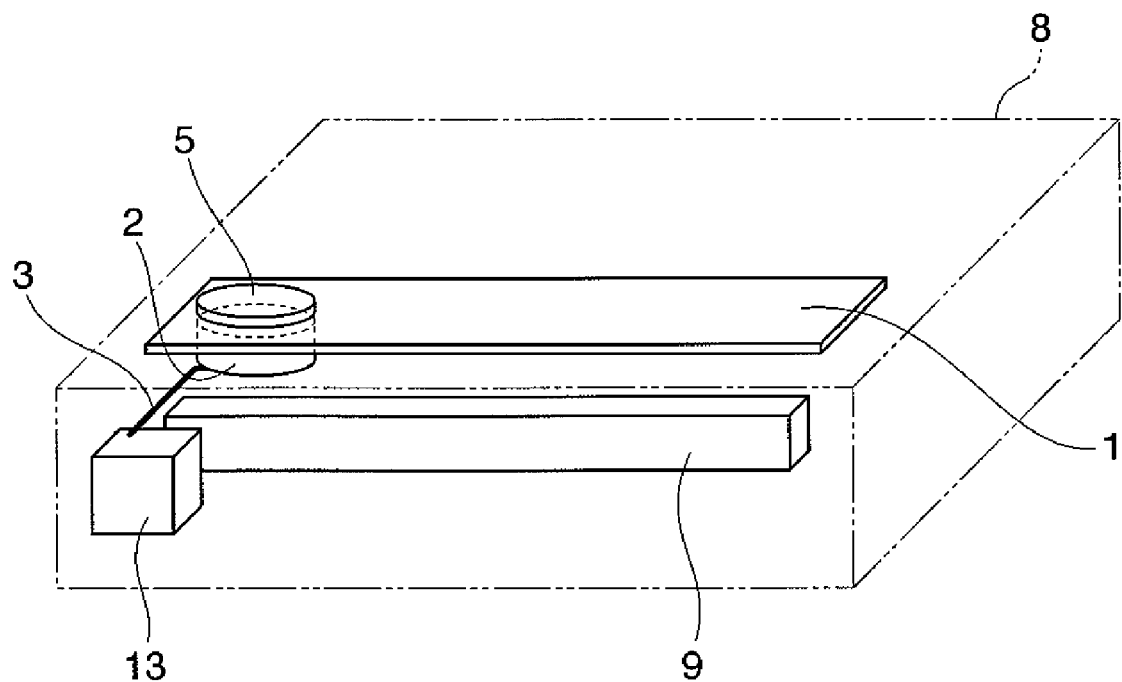
FIG. 2 is a perspective view showing the foreign substance removing apparatus in a state mounted to a reader section of a copying machine.

FIG. 2 is a perspective view showing the foreign substance removing apparatus mounted to a reader section 8 of the copying machine.

On a lower surface of the optical member 1, there is disposed a scanner unit 9 having nearly the same length as that of the optical member 1. A flux of light reflected from an original, which is conveyed onto the optical member 1, passes through the optical member 1 and is then focused on an optical sensor in the scanner unit 9, whereby image information on the original is read as image data.

A driving unit 13 is connected to the piezoelectric element 2 via a harness 3. The driving unit 13 applies an AC voltage to the piezoelectric element 2, whereby the piezoelectric element 2 is caused to vibrate and the bending vibration mode as shown in FIG. 1C or 1D is produced in the optical member 1. The driving unit 13 sweeps the AC voltage with a resonance frequency of the bending vibration mode shown in FIG. 1C and a frequency near the resonance frequency, and then sweeps the AC voltage with a resonance frequency of the bending vibration mode shown in FIG. 1D and a frequency near the resonance frequency. As a result, a resonance state where the vibration amplitude in the bending vibration mode is increased to a maximum can be obtained in a short period of time.

Figure 3:
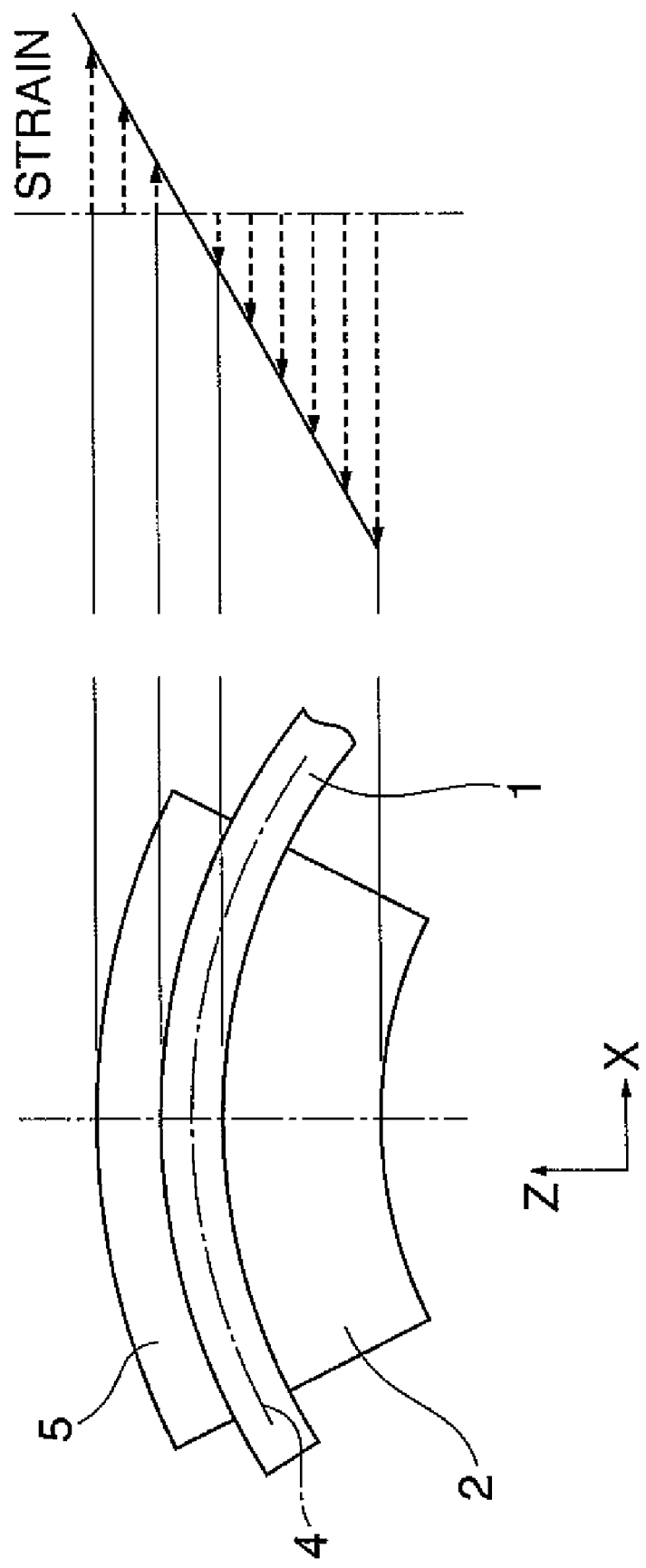
FIG. 3A is a fragmentary section view, taken along an X-Z plane of the foreign substance removing apparatus shown in FIGS. 1A to 1D, showing part of an optical member near a piezoelectric element and a circular plate.
FIG. 3B is a strain distribution diagram for the optical member.

FIG. 3A is a fragmentary sectional view taken along an X-Z plane of the foreign substance removing apparatus, showing part of the optical member 1 in vicinity of the piezoelectric element 2 and the circular disk 5, and FIG. 3B is a strain distribution diagram. It is assumed that the optical member 1 is in a vibrating state.

FIG. 3A shows a distortion state of the piezoelectric element 2 when a maximum displacement of the piezoelectric element 2 in the Z direction is reached. FIG. 3B shows a Z-directional strain distribution in the circular disk 5, the optical member 1, and the piezoelectric element 2.

As described in detail below, in the first embodiment, by appropriately setting the material and the Z-directional thickness of the circular disk 5, it is possible to position the bending neutral surface 4 near the center in the Z direction (thickness direction) of the optical member 1. As a result, as shown in FIG. 3B, there occurs contraction of the piezoelectric element 2 in the X direction (strains shown by left pointing arrows) in all the thickness-directional (Z-directional) region. On the other hand, in the circular disk 5 affixed to the upper surface of the optical member 1, elongation in the X direction (strains shown by right pointing arrows) occurs in all the thickness-direction as shown in FIG. 3B. As explained previously, the bending neutral surface 4 is positioned near the thickness-directional center of the optical member 1, and therefore, an amount of strain in the optical member 1 is made smaller than those in the piezoelectric element 2 and the circular disk 5.

Next, an explanation will be given of the function of the stainless circular disk 5 affixed to the upper surface of the optical member 1.

The circular disk 5, which is an elastic member disposed on one surface of the optical member 1 opposite from another surface thereof affixed with the piezoelectric element 2, functions to balance the rigidity of the piezoelectric element 2. The bending neutral surface of the optical member 1 is positioned at a central part in the thickness direction (Z direction) of the optical member 1 when the optical member 1 alone is considered, but the neutral surface is moved toward the piezoelectric element 2 when the piezoelectric element 2 is affixed to the optical member 1. To maintain the neutral surface at a thickness-directional central part of the optical member 1, an amount of increase in rigidity due to the piezoelectric element 2 being affixed can be compensated for by utilizing the circular disk 5 affixed to one side of the optical member 1 opposite from the other side thereof affixed with the piezoelectric element 2. Specifically, as shown in the below-mentioned formula (1), the material and thickness of the circular disk 5 can be set in such a manner that the product of the geometrical moment of area of the circular disk 5 and the Young's modulus thereof is made equal to the product of the geometrical moment of area and the Young's modulus of the piezoelectric element 2. As a result, it is possible to maintain the neutral surface 4 at a thickness-directional central part of the optical member 1. Although it is not inevitably necessary that the product of the geometrical moment of area and the Young's modulus of the circular disk 5 is made equal to the product of those of the piezoelectric element 2, the position of the neutral surface 4 can be made closer to the thickness-directional central part of the optical member 1 as the two products are closer to each other. Even though an allowable difference between these two products varies depending on the rigidity and thickness of the optical member 1, it is preferable that the material and thickness of the circular disk 5 be set such that the difference between these products falls within a proper range permitting the neutral surface 4 to be positioned inside the optical member 1.

$$E_2 \times \int_{A_2} z dA_2 = E_3 \times \int_{A_3} z dA_3 \quad (1)$$

In the formula (1), $E_2$ denotes Young's modulus of the piezoelectric element 2; $E_3$, Young's modulus of the circular disk 5; z, coordinate of a thickness-directional central part of the optical member 1; $dA_2$, minute sectional area of the piezoelectric element 2; and $dA_3$, minute sectional area of the circular disk 5.

The formula (1) can be rewritten into the below-mentioned formula (2).

$$E_2(t_1+t_2)t_2 B_2 = E_3(t_1+t_3)t_3 B_3 \quad (2)$$

In the formula (2), $t_1$ denotes thickness of the optical member 1; $t_2$, thickness of the piezoelectric element 2; $t_3$, thickness of the circular disk 5; $B_2$, diameter of the piezoelectric element 2; and $B_3$, diameter of the circular disk 5.

In each of formulae (1) and (2), when the left side is not equal to and larger than the right side, the neutral surface is moved toward the piezoelectric element 2. When the right side is larger than the left side, the neutral surface is moved toward the circular disk 5. It should be noted that, by forming the circular disk 5 by a material such as to permit the Young's modulus $E_3$ of the circular disk 5 to be greater than the Young's modulus $E_2$ of the piezoelectric element 2, the circular disk 5 can be thinner in thickness than the piezoelectric element 2.

As described above, in the foreign substance removing apparatus of this embodiment for removing foreign substances adhered to the optical member 1 which is a light transmitting member, the elastic member 5 is affixed to one surface of the optical member 1 opposite from another surface thereof affixed with the piezoelectric element 2 which is an electromechanical energy conversion element, whereby the neutral surface of bending vibration can be made close to a thickness-directional central part of the optical member 1. As a result, stress in the optical member 1 can be relieved, whereby an allowable vibration amplitude corresponding to the rupture limit of the optical member 1 can be increased. In addition, it is possible to increase a force applicable from the electromechanical energy conversion element to the light transmitting member, thus improving the ability of removing foreign substances. Furthermore, by setting the thickness of the elastic member 5 affixed to the optical member 1 depending on the relation between the Young's modulus of the elastic member 5 and that of the piezoelectric element 2, it is possible to make the bending neutral surface closer to the thickness-directional central part of the optical member 1. Moreover, the circular disk 5 is disposed in such a manner that the projected shape of the circular disk 5 on the optical member 1 is in coincidence with the projected shape of the piezoelectric element 2 on the optical member 1, and the circular disk 5 is formed to have a thickness that satisfies formulae (1) and (2). As a result, the neutral surface 4 can be maintained at the thickness-directional central part of the optical member 1 over the entire surface of the optical member 1 by sandwiching only part of the optical member 1 between the circular disk 5 and the piezoelectric element 2. It should be noted that the Young's modulus of a stainless material used to form the circular disk 5 is about three times as large as that of the piezoelectric element 2, and a stainless material generally available has a thickness thereof selectable among discrete values. For this reason, in some cases, there is no stainless material having a thickness close to a value determined by the calculation based formulae (1) and (2). In such a case, it is preferable that the thickness of the stainless material be adjusted using a rolling process.

Second Embodiment

Next, an explanation will be given of a second embodiment of the present invention.

Figure 4:
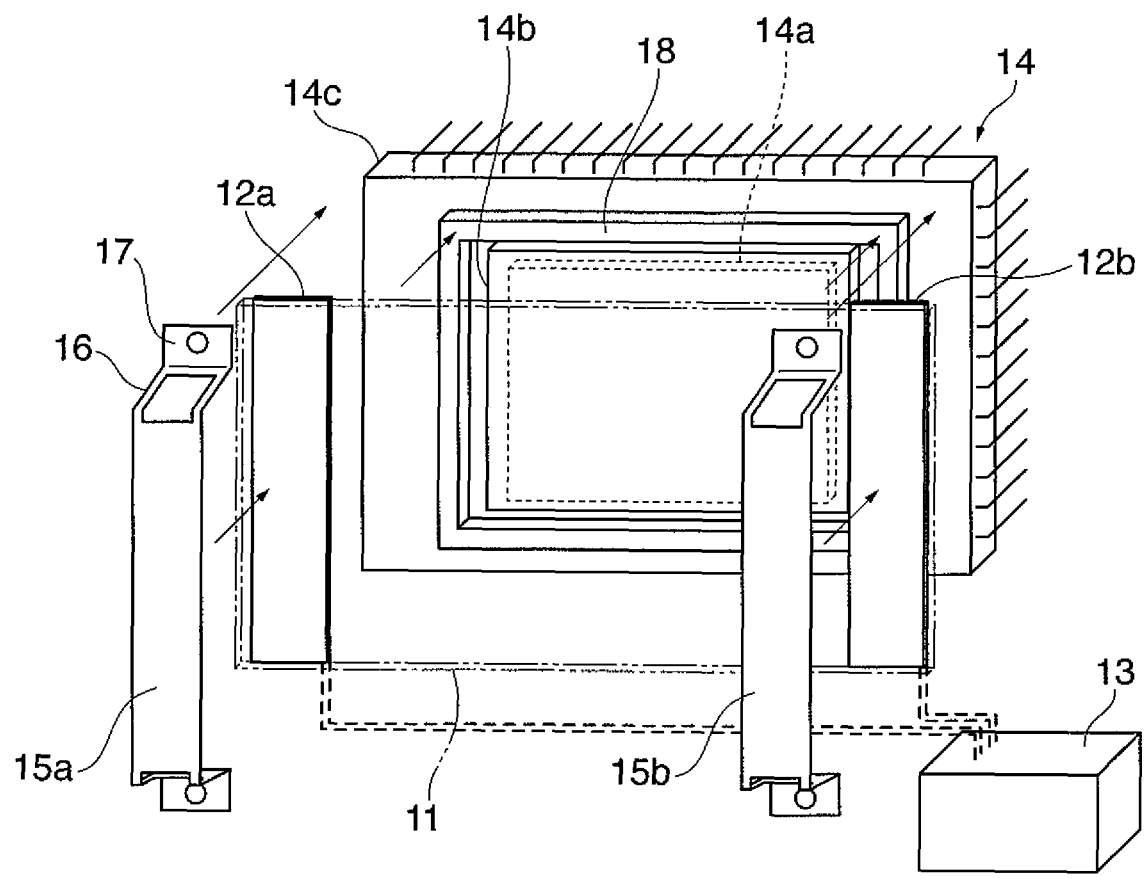
FIG. 4 is an exploded perspective view showing the construction of a foreign substance removing apparatus according to a second embodiment of the present invention.

FIG. 4 is an exploded perspective view showing the construction of a foreign substance removing apparatus according to the second embodiment.

In the second embodiment, a rectangular plate-like transparent optical filter 11 is disposed in front of an image pickup device of a digital still camera. The optical filter 11 functions as a low pass filter in the digital still camera, corresponds to the optical member 1 in the first embodiment, and is used as a vibrating member of the foreign substance removing apparatus. The optical filter 11 has left and right ends thereof affixed with a rectangular plate-like piezoelectric elements 12a and 12b, using adhesive or the like. An AC voltage is applied from a driving unit 13 to each piezoelectric element.

An image pickup device package 14 is comprised of an image pickup device 14a, a cover glass 14b, and a substrate 14c, wherein the image pickup device 14a is sealed with the cover glass 14b. Between the substrate 14c of the image pickup device package 14 and the optical filter 11, there is disposed a rectangular frame-like supporting member 18 that is formed by an elastic member such as rubber. The supporting member 18 is affixed to the optical filter 11 and the substrate 14c, using adhesive or the like. As a result, the optical filter 11 is supported by and fixed for vibration to the substrate 14c. The image pickup device 14a and the cover glass 14b are positioned in a closed space defined by the optical filter 11, the substrate 14c and the supporting member 18. As a result, foreign substances are prevented from being adhered to one surface of the cover glass 14b (opposite from another surface directed to the image pickup device 14a) and from being adhered to a rear surface of the optical filter 11 (directed to the image pickup device 14a).

The elastic members 15a, 15b correspond to the stainless circular disk 5 in the first embodiment and are each comprised of a stainless rectangular plate having the same planar shape as those of the piezoelectric elements 12a, 12b. The elastic members 15a, 15b are each formed by pressing a stainless sheet material. Each elastic member has upper and lower ends to each of which an arm portion and a fixing portion (only those at the upper end of the elastic member 15a are denoted by reference numerals 16 and 17) are integrally formed therewith. The elastic members 15a, 15b are affixed to one surface of the optical filter 11 so as to face the piezoelectric elements 12a and 12b, the one surface being opposite from another surface thereof affixed with the piezoelectric elements 12a, 12b. The four fixing portions (only one of which is denoted by 17) are fixed to the substrate 14c of the image pickup device package 14 using screws, whereby the foreign substance removing apparatus comprised of the optical filter 11 and the piezoelectric elements 12a, 12b is mounted to the image pickup device package 14. The elastic members 15a, 15b have their thicknesses determined according to formulae (1) and (2) explained in the first embodiment.

Figure 5A:
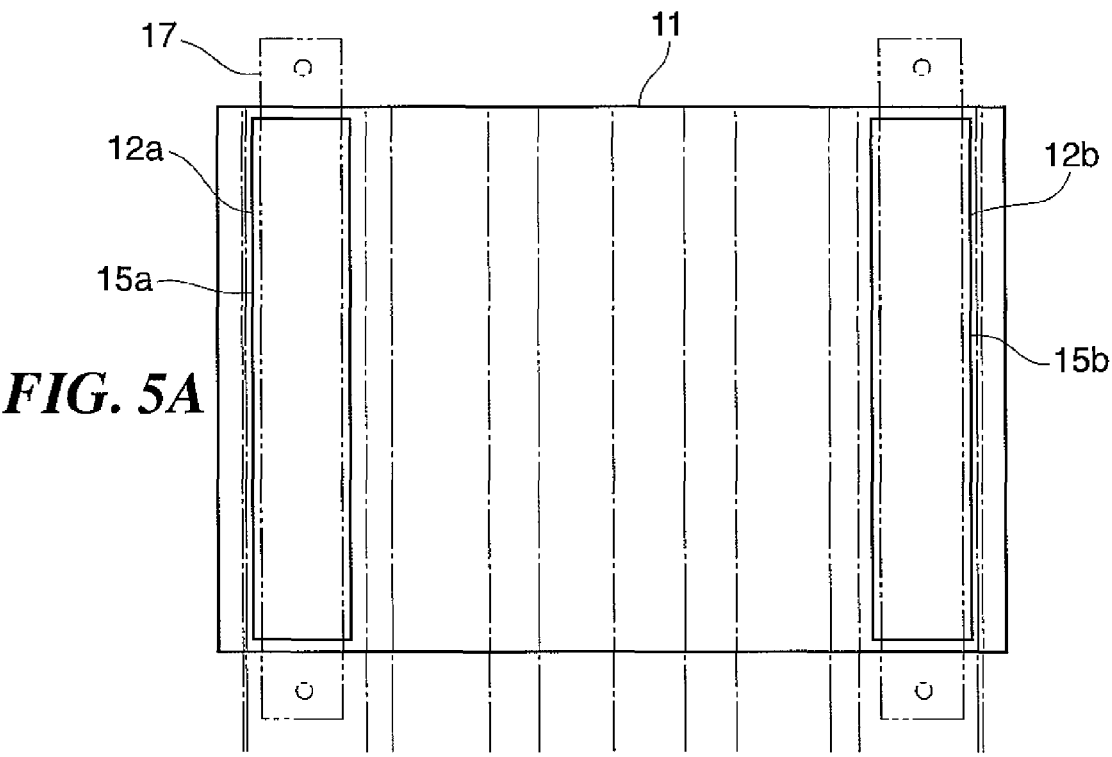
FIG. 5A is a plan view of an optical filter, a piezoelectric element, and an elastic member that are shown in FIG. 4.
Figure 5B:
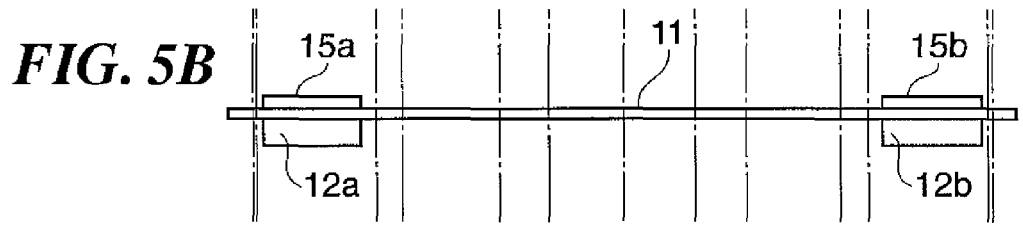
FIG. 5B is a side view of the optical filter, the piezoelectric element, and the elastic member.
Figure 5C:
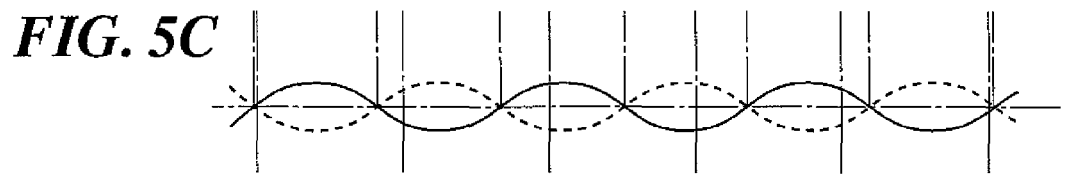
FIG. 5C is a view showing a displacement distribution in a vibration mode in which the optical filter is caused to vibrate.
Figure 5D:
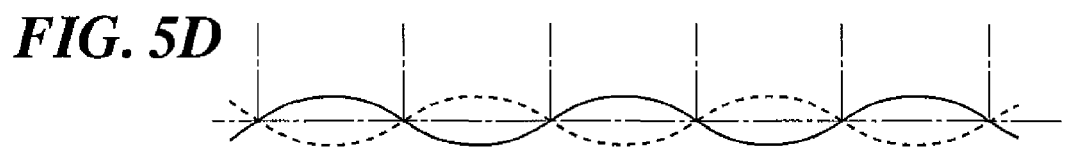
FIG. 5D is a view showing a displacement distribution in another vibration mode in which the optical filter is caused to vibrate.

FIG. 5A is a plan view showing the optical filter 11, the piezoelectric elements 12a, 12b, and the elastic members 15a, 15b, which are shown in FIG. 4. FIG. 5B is a side view, and FIGS. 5C and 5D are views showing displacement distributions in two vibration modes in which the optical filter 11 is caused to vibrate.

The elastic members 15a, 15b are disposed on the optical filter 11 so as to face respective ones of the piezoelectric elements 12a, 12b. By being caused to vibrate by the piezoelectric elements 12a, 12b, the optical filter 11 vibrates in a six-order vibration mode having seven nodes as shown in FIG. 5C and in a fifth-order vibration mode having six nodes as shown in FIG. 5D. In these two vibration modes, the piezoelectric elements 12a, 12b are positioned at anti-nodes common to the two vibration modes.

Since the elastic members 15a, 15b have their thicknesses determined according to formulae (1) and (2) described in the first embodiment, bending distortion occurs in the two vibration modes, with the bending neutral surface positioned at a central part of the optical filter 11. As a result, without an excessive stress being produced in the optical filter 11, stress generated by the piezoelectric elements 12a, 12b can be efficiently converted into vibration of the optical filter 11, whereby foreign substances can be removed.

In addition, according to the second embodiment, the supporting members for supporting and fixing the optical filter 11 are comprised of the elastic members 15a, 15b, which eliminates the necessity of the provision of additional supporting members, thus simplifying the construction.

Furthermore, the arm portions (only one of which is denoted by 16) are formed integrally with the elastic members 15a, 15b at locations close to nodes of vibration in the piezoelectric elements 12a, 12b, making it possible to prevent vibration of the optical filter 11 from being greatly hindered.

Third Embodiment

Next, an explanation will be given of a third embodiment of the present invention.

Since the third embodiment is basically the same in construction as the second embodiment, those portions which are the same as or similar to corresponding portions of the second embodiment are denoted by like reference numerals. In the explanation of the third embodiment, only different portions will be explained, with explanations of common portions omitted.

Figure 6:
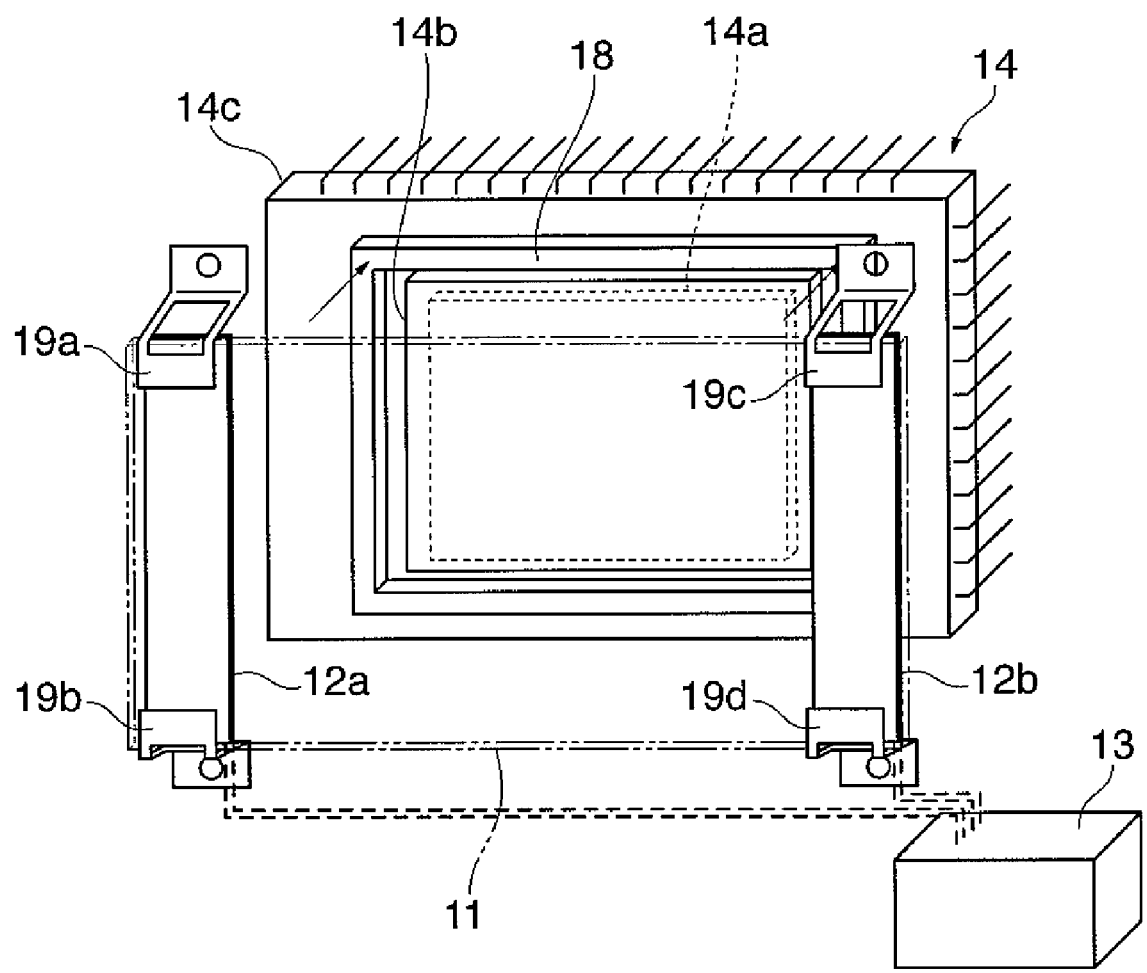
FIG. 6 is an exploded perspective view showing the construction of a foreign substance removing apparatus according to a third embodiment of the present invention.

FIG. 6 is an exploded perspective view showing the construction of a foreign substance removing apparatus according to the third embodiment.

In the third embodiment, elastic members 19a to 19d are affixed, using adhesive or the like, to one surface of the optical filter 11 opposite from another surface thereof affixed with the piezoelectric elements 12a, 12b. The elastic members 19a to 19d are provided at upper and lower ends of the optical filter 11 so as to face the piezoelectric elements 12a, 12b. Specifically, the elastic members 19a to 19d are disposed in such a manner that projected shapes of the elastic members 19a to 19d on the optical filter 11 are included in projected shapes of the piezoelectric elements 12a, 12b on the optical filter 11.

The elastic members 19a to 19d are each provided with an arm portion and a fixing portion as in the second embodiment, and the fixing portion is fixed to the substrate 14c of the image pickup device package 14, using screws.

In a process of fabricating the optical filter 11, the optical filter 11 which is rectangular is cut out from a material (glass, for example), and edged portions at ends of the cut-out optical filter are polished to be smoothened. In some cases, however, minute cracks cannot be removed from the cut-out optical filter. Therefore, there is a risk that the cut-out optical filter can be broken if strains due to external force are produced therein.

In contrast, according to the third embodiment, the elastic members 19a to 19d are affixed to end portions of the optical filter 11, whereby strain in the end portions of the optical filter 11 can be reduced. For this reason, even if there is no sufficient margin for the rupture limit of the optical filter 11 against bending stress caused by vibration, it is possible to suppress development of cracks in the edged portions of the optical filter 11. As a result, the reliability of the foreign substance removing apparatus can be improved.

Fourth Embodiment

Next, an explanation will be given of a fourth embodiment of the present invention.

The fourth embodiment is basically the same as or similar in construction to that of the second embodiment. Therefore, like parts that are the same as or similar to corresponding parts of the second embodiment are denoted by like reference numerals and only different parts will be explained in the explanation of the fourth embodiment, with explanations on like parts omitted.

Figure 7:
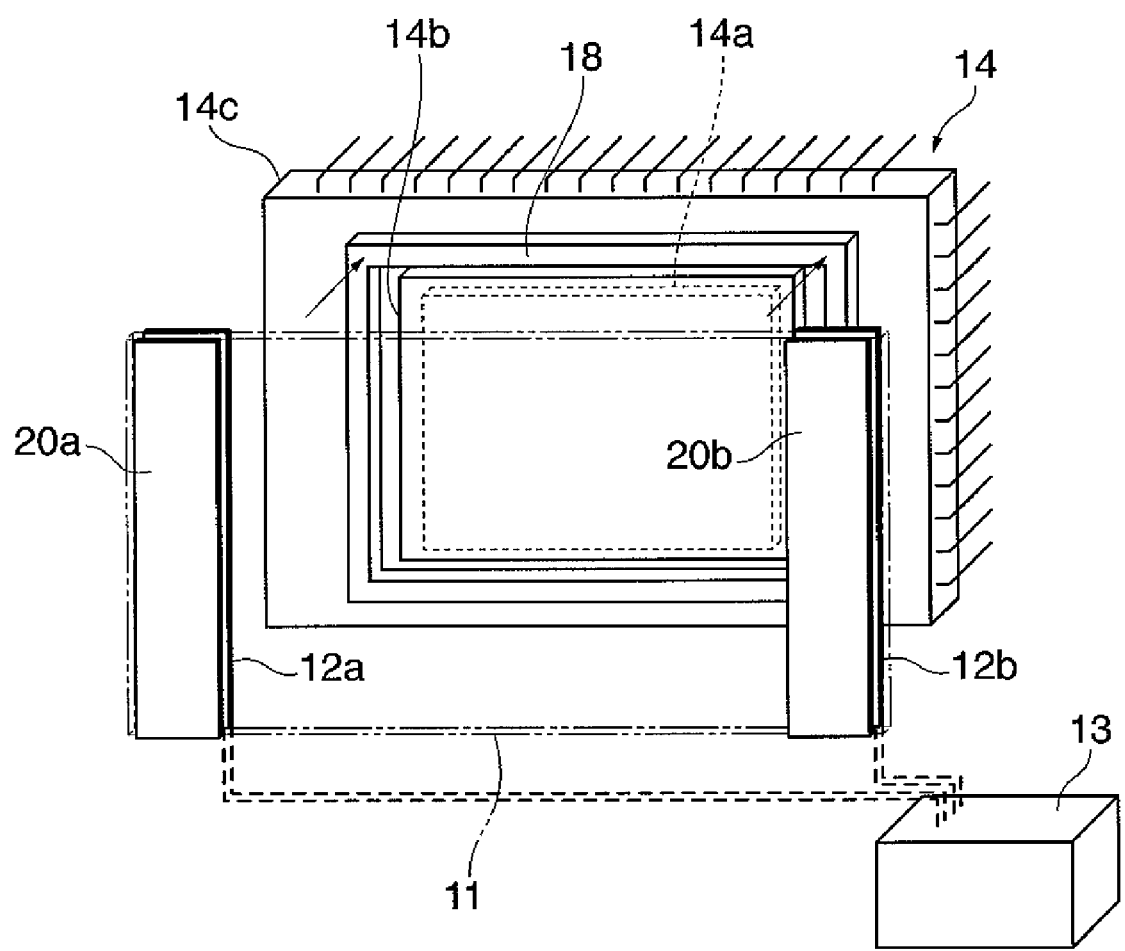
FIG. 7 is an exploded perspective view showing the construction of a foreign substance removing apparatus according to a fourth embodiment of the present invention.
Figure 8:
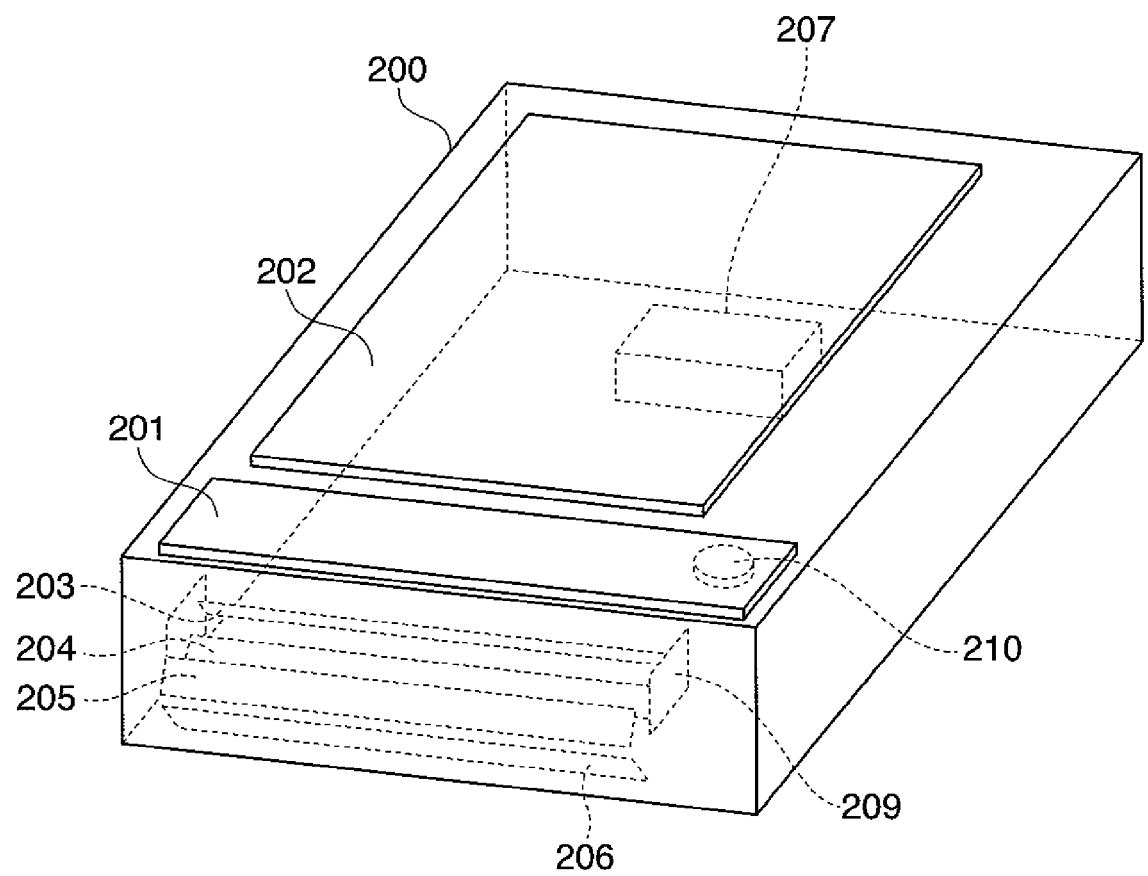
FIG. 8 is a perspective view of a conventional image reading apparatus.
Figures 11A, 11B:
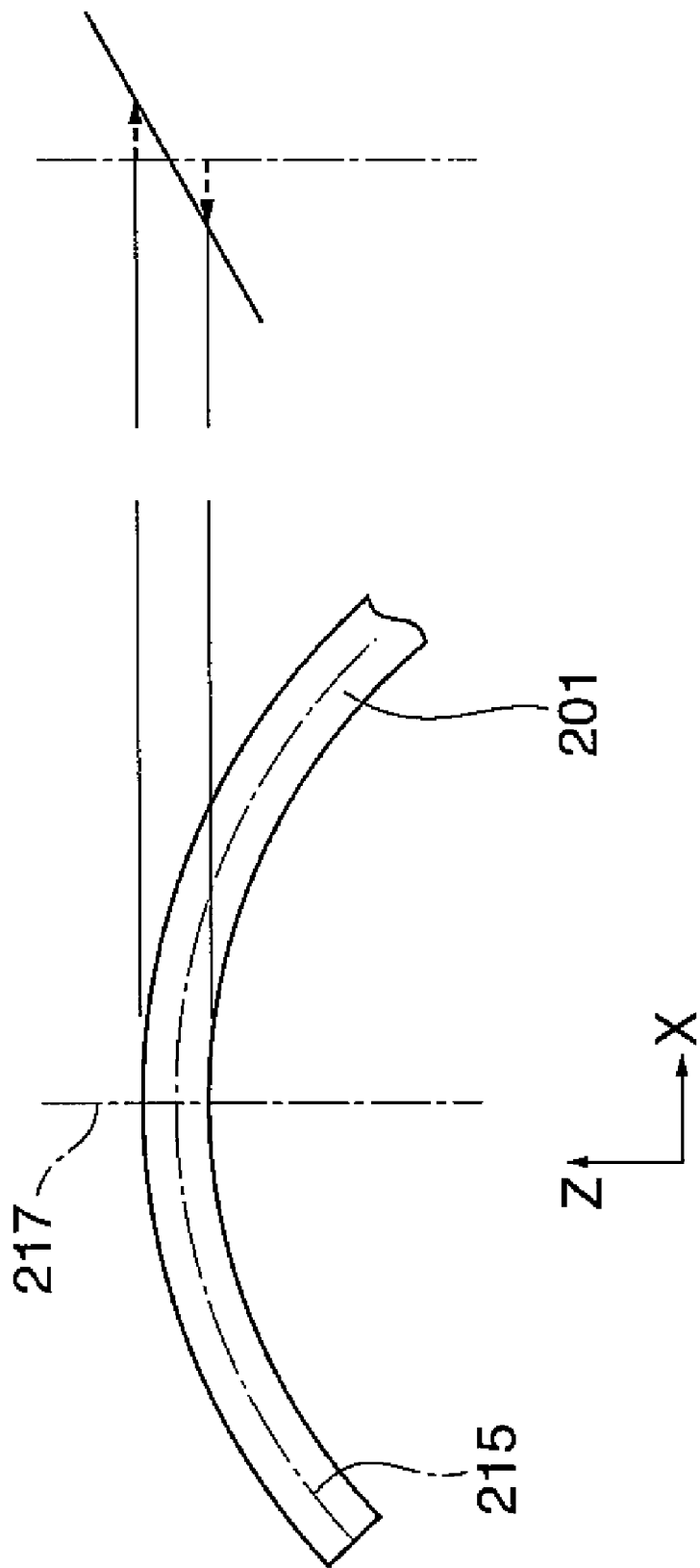
FIG. 11B is a view showing an X-directional strain in the ADF platen and the piezoelectric element.

FIG. 7 is an exploded perspective view showing the construction of a foreign substance removing apparatus according to the fourth embodiment.

In a process of fabricating the piezoelectric elements 12a, 12b, a plate-like piezoelectric material is cut into a predetermined shape, and electrodes are formed on opposite surfaces of the cut-out material using printing, deposition or the like of electro-conductive paint. Subsequently, the piezoelectric material is subjected to polarization in the thickness direction.

In the fourth embodiment, a piezoelectric material for which the electrode-forming and polarization processes for fabrication of the piezoelectric elements 12a, 12b have not been performed as yet are cut into the same shapes as those of the piezoelectric elements 12a, 12b, and the resultant products are used as the elastic members 20a, 20b. The thus obtained elastic members 20a, 20b are affixed to one surface of the optical filter 11 opposite from another surface thereof already affixed with the piezoelectric elements 12a, 12b. At this time, the elastic members 20a, 20b are disposed such that the projected shapes of the elastic members 20a, 20b on the optical filter 11 are in coincidence with the projected shapes of the piezoelectric elements 12a, 12b on the optical filter 11.

The elastic members 20a, 20b in the fourth embodiment can be fabricated in the fabrication process of the piezoelectric elements 12a, 12b without using a new or different material. It should be noted that the elastic members 20a, 20b have their mechanical properties that are slightly different in Young's modulus between before and after the polarization but are not greatly different from those of the piezoelectric elements 12a, 12b. Also as for the linear expansion coefficients of the elastic members 20a, 20b, they are only slightly different between before and after the polarization, which makes it possible to suppress their distortion relative to the piezoelectric elements 12a, 12b due to thermal stress caused by environmental temperature in use or by self-temperature rise, to a minimum.

In the fourth embodiment, the elastic members 20a, 20b are formed by of a piezoelectric material not subjected to polarization. Alternatively, piezoelectric elements having been subjected to an electrode-forming and polarization process may be used as the elastic members 20a, 20b in a state where the electrodes formed in opposite surfaces are short-circuited to each other. In that case, the elastic members 20a, 20b have their mechanical properties that are the same as those of the piezoelectric elements 12a, 12b, which makes it possible to position the bending neutral surface at a thickness-directional central part of the optical filter 11.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-086061 filed Mar. 27, 2006 which is hereby incorporated by reference herein in its entirety.

What is claimed is:

1. A foreign substance removing apparatus for removing foreign substances adhered to a surface of a plate-like light transmitting member disposed in a light ray incident path, comprising:
   an electromechanical energy conversion element bonded to a first plane of said light transmitting member;
   an elastic member bonded to a second plane of said light transmitting member so as to face said electromechanical energy conversion element, the second plane being opposite from the first plane, said elastic member enabling a bending neutral surface to be maintained inside of said light transmitting member by compensating for an amount of increase in rigidity due to said electromechanical energy conversion element being bonded to said light transmitting member; and
   an AC voltage applying circuit for applying an AC voltage to said electromechanical energy conversion element to cause said light transmitting member to elastically vibrate in a direction perpendicular to the planes thereof, thereby removing the foreign substances adhered to the surface of said light transmitting member; wherein
   said elastic member has a thickness thereof made smaller than that of said electromechanical energy conversion element when said electromechanical energy conversion element has its Young's modulus smaller than that of said elastic member so that said elastic member enables the bending neutral surface to be maintained of said light transmitting member.

2. The foreign substance removing apparatus according to claim 1, wherein a projected shape of said elastic member on said light transmitting member is in coincidence with a projected shape of said electromechanical energy conversion element on said light transmitting member.

3. The foreign substance removing apparatus according to claim 1, further including:
   a support fixing member formed integrally with said elastic member for supporting and fixing said light transmitting member.

4. The foreign substance removing apparatus according to claim 1, wherein at least one of material and thickness of said elastic member is set such that a product of a Young's modulus of said electromechanical energy conversion element and a geometrical moment of area thereof with respect to an axis extending in a direction perpendicular to a thickness direction of said light transmitting member and passing through a center of said light transmitting member in the thickness direction thereof is made equal to a product of a Young's modulus of said elastic member and a geometrical moment of area thereof with respect to the axis.

5. The foreign substance removing apparatus according to claim 1, wherein said elastic member is formed by a piezoelectric material.

6. The foreign substance removing apparatus according to claim 1, wherein said light transmitting member functions as a low pass filter.

* * * * *